United States Patent
Liang et al.

(10) Patent No.: US 8,081,935 B2
(45) Date of Patent: Dec. 20, 2011

(54) MULTIPLE-MODE MODULATOR TO PROCESS BASEBAND SIGNALS

(75) Inventors: Paul Cheng-Po Liang, Santa Clara, CA (US); Koji Takinami, Saratoga, CA (US); Richard Walsworth, Menlo Park, CA (US)

(73) Assignee: Panasonic Corporation, Osaka (JP)

( * ) Notice: Subject to any disclaimer, the term of this patent is extended or adjusted under 35 U.S.C. 154(b) by 1017 days.

(21) Appl. No.: 12/008,132

(22) Filed: Jan. 8, 2008

(65) Prior Publication Data

US 2009/0176464 A1   Jul. 9, 2009

(51) Int. Cl.
*H04B 1/66* (2006.01)
*H01Q 11/12* (2006.01)

(52) U.S. Cl. ........... 455/102; 455/108; 455/114.2; 455/127.2; 375/297; 375/298; 375/300

(58) Field of Classification Search .......... 455/102, 455/108, 110, 114.2, 114.3, 115.1, 115.3, 455/127.1, 127.2, 127.3, 69, 522; 375/297, 375/298, 300, 302
See application file for complete search history.

(56) References Cited

U.S. PATENT DOCUMENTS

| | | | | |
|---|---|---|---|---|
| 6,043,707 A | | 3/2000 | Budnik | 330/10 |
| 6,275,685 B1 * | | 8/2001 | Wessel et al. | 455/114.3 |
| 6,906,996 B2 * | | 6/2005 | Ballantyne | 375/298 |
| 7,180,384 B2 * | | 2/2007 | Efstathiou et al. | 375/299 |
| 7,545,880 B1 * | | 6/2009 | Coons et al. | 375/296 |
| 7,853,212 B2 * | | 12/2010 | van Waasen | 455/102 |

* cited by examiner

*Primary Examiner* — Quochien B Vuong

(57) ABSTRACT

A multiple-mode modulator is configured similarly to a direct conversion quadrature modulator with an infusion of an amplitude modulation signal path from a large signal polar modulator to improve the power amplifier efficiency. The multiple-mode modulator also includes a radio frequency signal path. The multiple-mode modulator is configured to receive a baseband signal, convert the baseband signal to a radio frequency (RF) signal, and to process the RF signal according to either a polar mode or a quadrature mode, depending on a time-varying input voltage of the RF signal. When the power amplifier operates in the linear region, the RF signal is processed according to the quadrature mode. When the power amplifier operates in the compressed region, the RF signal is processed according to the polar mode. The multiple-mode modulator can be configured according to a small signal polar architecture or a large signal polar architecture, having either an open-loop or closed-loop configuration.

34 Claims, 15 Drawing Sheets

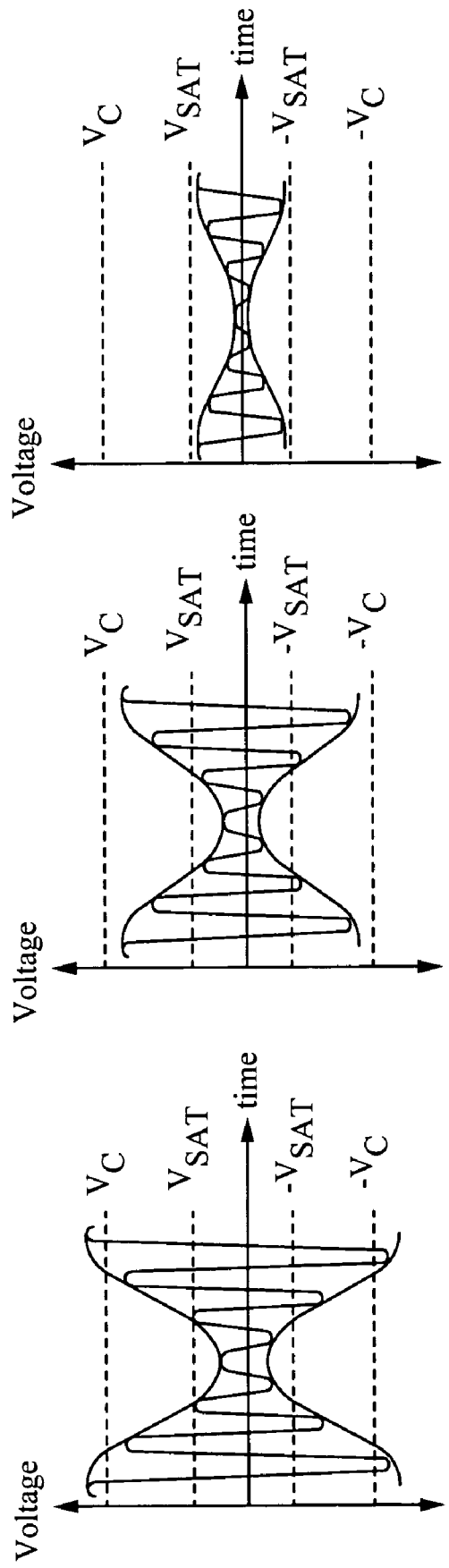

MULTIPLE-MODE MODULATOR TO PROCESS BASEBAND SIGNALS

FIELD OF THE INVENTION

The present invention relates to modulators. More particularly, the present invention relates to a multiple-mode modulator to process baseband signals.

BACKGROUND OF THE INVENTION

Modulators are used extensively in the wireless communications industry. Using a typical modulator, an input baseband signal is modulated, amplified, and transmitted as a radio frequency (RF) signal. To generate the RF signal according to quadrature modulation, an input signal is first processed by a baseband processor to generate an in-phase (I) signal component and a quadrature (Q) signal component. The I and Q (I/Q) signal components are processed and mixed to form the RF signal.

An RF signal can also be generated using polar modulation, where the analog I/Q signal is converted to an amplitude modulation (AM) signal component and a phase modulation (PM) signal component. In a polar modulator, the AM signal and the PM signal are processed separately before being combined to create the desired signal.

There are several conventional modulator architectures, for example a super-heterodyne quadrature modulator, a direct conversion quadrature modulator, a small signal polar modulator, a large signal polar modulator with closed-loop compensation, and a large signal polar modulator with open-loop compensation. Each modulator includes a final stage power amplifier (PA).

FIG. 1 illustrates the basic input port definitions of a conventional power amplifier. The power amplifier 26 includes three input ports configured to receive an input supply voltage, an input bias voltage, and an input RF signal. The power amplifier 26 includes an output port configured to output an output RF signal. The power amplifier 26 is also coupled to ground.

FIG. 2 illustrates a power amplifier configured to operate within a quadrature modulator. The power amplifier 27 processes the amplitude modulation through the input RF signal port. The input supply voltage and the input bias voltage are fixed.

FIG. 3 illustrates a conventional super-heterodyne quadrature modulator. The super-heterodyne quadrature modulator includes a mixer 2, a signal source 4, an intermediate frequency (IF) variable gain amplifier (VGA) 6, a bandpass filter (BPF) 8, a mixer 10, a signal source 12, a BPF 14, a RF VGA 16, a BPF 18, a linear final stage power amplifier 20, a duplexer 22, and an antenna 24. An input baseband signal is mixed to an intermediate frequency by the mixer 2. The IF signal output from the mixer 2 is passed through the VGA 6 and the BPF 8. The resulting signal is mixed to a RF signal by the mixer 10. The RF signal output from the mixer 10 is passed through the BPF 14, the VGA 16, and the BPF 18, and input to the final stage PA 20. The BPF 18 is typically a surface acoustic wave (SAW) filter. The amplified RF signal output from the final stage PA 20 is provided to the duplexer 22 and transmitted via the antenna 24. Any power level control is performed before the final stage PA 20. The super-heterodyne quadrature modulator requires complicated circuitry. Usually, the final stage PA 20 efficiency is poor especially with signals which have high Peak-to-Average Ratio (PAR). PA back-off is typically required to maintain an in-band signal quality and contain out-of-band spectral regrowth.

FIG. 4 illustrates a conventional direct conversion quadrature modulator. The difference between the super-heterodyne quadrature modulator of FIG. 3 and the direct conversion quadrature modulator of FIG. 4 is that the input baseband signal is mixed directly to an RF signal in the direct conversion quadrature modulator. The direct conversion quadrature modulator includes a mixer 30, a signal source 32, a VGA 34, a BPF 36, a VGA 38, a BPF 40, a linear power amplifier 42, a duplexer 44, and an antenna 46. An input baseband signal is mixed to an RF signal by the mixer 30. The RF signal output from the mixer 30 is passed through the VGA 34, the BPF 36, the VGA 38, and the BPF 40, and input to the final stage PA 42. The amplified RF signal output from the final stage PA 42 is provided to the interface circuit 44 and transmitted via the antenna 46. In this architecture, the input signal is converted to RF directly from baseband. The elimination of the IF stage, as compared with the super-heterodyne quadrature modulator, significantly reduces the circuit cost and power consumption. Similarly to the super-heterodyne quadrature modulator, the direct conversion quadrature modulator also suffers from poor PA efficiency. For signals with a large peak-to-average ratio, PA back-off is required to avoid signal quality degradation. This will further reduce the PA efficiency of the direct conversion quadrature modulator. However, for several applications, direct conversion quadrature modulator offers an effective compromise of performance for power consumption and circuit complexity.

FIG. 5 illustrates a power amplifier configured to operate within a polar modulator. The power amplifier 28 processes the amplitude modulation through the input supply voltage port. The input supply voltage is varied by the AM-to-AM compensation module. The amplitude modulation is input through the input RF signal port. The input bias voltage is fixed.

FIG. 6 illustrates a conventional small signal polar modulator. The small signal polar modulator includes a mixer 50, a signal source 52, an amplitude modulation (AM) detector 54, an AM and power controller 56, a translational loop 58, a preliminary stage amplifier 70, a linear final stage power amplifier 72, a duplexer 74, and an antenna 76. The translational loop 58 includes a limiter 60, a phase/frequency detector 62, a loop filter 64, a transmit voltage controlled oscillator (TxVCO) 66, and a mixer 68. The AM detector 54 and the AM and power controller 56 form an amplitude path, and the translational loop forms a phase path. The AM detector 54 and the limiter 60 convert I/Q signals to polar signals. An input baseband signal is mixed to an IF signal by the mixer 50. The IF signal output from the mixer 50 is direct to the AM detector 54 and the translational loop 58. The phase/frequency detector 62, the loop filter 64, the TxVCO 66, and the mixer 68 form a phase-locked loop. The output of the TxVCO 66 is a phase modulation (PM) signal, which is input to the preliminary stage amplifier 70. An AM signal output from the AM and power controller 56 is combined with the PM signal at the preliminary stage amplifier 70. Control of the preliminary stage amplifier 70 is provided by the AM and power controller 56. However, the output power of the preliminary stage amplifier 70 is not sufficient, thus requiring the final stage PA 72. An amplified RF signal is output from the preliminary stage amplifier 70 to the final stage PA 72. The amplified RF signal output from the final stage PA 72 is provided to the duplexer 74 and transmitted via the antenna 76.

In some configurations, the small signal polar modulator maintains the translational loop architecture while adding envelope modulation at the preliminary stage amplifier. In this configuration, full modulation exists before the final stage PA. Therefore, PA back-off is required to maintain good signal quality. As a result, the final stage PA efficiency is poor. Both open-loop and closed-loop compensation can be used to compensate for non-linearities introduced by the preliminary stage amplifier. Compared with a large signal polar modulator, discussed below, the compensation path within the small signal polar modulator is easier to implement. However, the small signal polar modulator does not reach the same level of PA efficiency achieved by a large signal polar modulator.

The transformation from the I/Q domain, baseband signals, to the polar domain is a bandwidth expansion process. Therefore, the small signal polar modulator suffers from the expanded bandwidth problem, which results in added circuit complexity and current consumption.

FIG. 7 illustrates a conventional large signal polar modulator with closed-loop compensation. The primary difference between the small signal polar modulator and the large signal polar modulator is that in the large signal polar modulator the AM signal from the amplitude path and the PM signal from the phase path are combined at the final stage PA. In the small signal polar modulator, the AM signal and the PM signal are combined at the preliminary stage amplifier prior to the final stage PA. The large signal polar modulator with closed-loop compensation includes a mixer 80, a signal source 82, an AM detector 84, an AM and power controller 86, a translational loop 88, a preliminary stage amplifier 100, a linear power amplifier 102, a coupler 104, a duplexer 106, and an antenna 108. The translational loop 88 includes a limiter 90, a phase/frequency detector 92, a loop filter 94, a TxVCO 96, and a mixer 98. The AM detector 84 and the AM and power controller 86 form the amplitude path, and the translational loop forms the phase path. An input baseband signal is mixed to an IF signal by the mixer 80. The IF signal output from the mixer 80 is directed to the AM detector 84 and the translational loop 88. The output of the TxVCO 96 is a phase modulation (PM) signal, which is input to the preliminary stage amplifier 100. The preliminary stage amplifier 100 outputs an amplified PM signal. An AM signal output from the AM and power controller 86 is combined with the amplified PM signal at the final stage PA 102. Power control of the final stage PA 102 is provided by the AM and power controller 86. An amplified RF signal is output from the final stage PA 102 to the coupler 104. The coupler 104 directs the amplified RF signal as feedback to the mixer 98 in the phase path and to the AM and power controller 86 in the amplitude path. The amplified RF signal output from the PA 102 is also provided from the coupler 104 to the duplexer 106 and transmitted via the antenna 108.

The large signal polar modulator with closed-loop compensation maintains the translational loop architecture while adding the envelope modulation at the final stage PA. The final stage PA is operated in the compressed region. Therefore, this architecture has the potential of improved PA efficiency compared with the quadrature modulators (FIGS. 3 and 4) and the small signal polar modulator (FIG. 6).

The large signal polar modulator with closed-loop compensation has been implemented for Global System for Mobile communication (GSM) and Enhanced Data rates for GSM Evolution (EDGE) applications. However, there are doubts about the possibilities of applying this architecture to wider bandwidth modulations and standards with large power control ranges. With large bandwidth signals, for example Universal Mobile Telecommunications System (UMTS), the original signal is about 5 MHz wide in the I/Q domain. When the I/Q signal is converted to the polar domain, the resulting AM and PM signals are close to 25 MHz wide. It is very difficult to implement the traditional translational loop to handle such a bandwidth while keeping the in-band noise low.

Power control for code division multiple access (CDMA) systems is very important. Most standards which use CDMA concepts have a very large power control range. It is questionable as to whether or not the large signal polar architecture with closed-loop feedback can be applied to CDMA standards with reasonable circuit complexity and current consumption.

FIG. 8 illustrates a conventional large signal polar modulator with open-loop compensation. The large signal polar modulator of FIG. 8 does not include a feedback compensation path. The large signal polar modulator with open-loop compensation includes a pre-distortion module 110, a mixer 120, a signal source 122, an AM and power controller 126, a translational loop 128, a preliminary stage amplifier 140, a power amplifier 142, a duplexer 144, and an antenna 146. The translational loop 128 includes a limiter 130, a phase/frequency detector 132, a loop filter 134, a TxVCO 136, and a mixer 138. The AM and power controller 126 forms the amplitude path, and the translational loop forms the phase path. An input baseband signal is pre-distorted by the pre-distortion module 110. A distorted baseband signal is output from the pre-distortion module 110 and is mixed to an IF signal by the mixer 120. The IF signal output from the mixer 120 is directed to the translational loop 128. The phase/frequency detector 132, the loop filter 134, the TxVCO 136, and the mixer 138 form a phase-locked loop. The output of the TxVCO 136 is a phase modulation (PM) signal, which is input to the preliminary stage amplifier 140. The preliminary stage amplifier 140 outputs an amplified PM signal. An AM signal output from the AM and power controller 126 is combined with the amplified PM signal at the final stage PA 142. Control of the PA 142 is provided by the AM and power controller 126. An amplified RF signal is output from the final stage PA 142 to the duplexer 144 and transmitted via the antenna 146.

The large signal polar modulator with open-loop compensation also maintains the translational loop architecture, and imposes envelope modulation at the final stage PA. The final stage PA is operated as a switch, and therefore, with the potential of improved PA efficiency. Therefore, open-loop compensation is feasible as long as the saturated PA behaves very consistently over temperature variation and aging and the PA is properly pre-calibrated at the assembly line.

The bandwidth expansion process associated with converting signals from the I/Q domain to the polar domain is a concern related to polar implementations. This imposes significant design challenges to expand polar architectures to much higher data rate transmission standards, for example 802.11x or WiMAX. This is a common concern for all polar implementations.

By using the translational loop architecture in the polar implementations, the transmit VCO (TxVCO) is in the modulation path of the PM signals. This poses significant design challenges to the TxVCO design. Compared with a quadrature implementation, VCOs included in a quadrature implementation are only used as an element for mixing the signal to higher frequencies. As a result, the VCO designs in quadrature modulators are more independent from modulation to modulation.

Another common concern for polar implementation is an AM signal-to-PM signal alignment problem. In many allocations, the AM signal from the AM modulation path and the PM signal from the PM modulation path are recombined with sub-nanosecond resolution. The analog components on the AM and PM modulation paths are not as stable as digital components and are subject to temperature variation and aging. As data rate modulations continue to increase, the mis-alignment tolerance between AM and PM modulation paths will be further reduced.

GSM is widely deployed throughout the world. However, GSM is optimized for voice only. Other applications require higher data rates, thereby necessitating the ability to transmit and receive the data using other techniques, for example, EDGE, CDMA2000, UMTS, 802.11x, and Worldwide Interoperability for Microwave Access (WiMAX). To accommodate multiple techniques, or standards, within one device, a multiple-mode modulator is required. Incorporating multiple modes into one device utilizes the current infrastructure while obtaining higher data rates for advanced services.

As GSM transmitters have evolved, the translational loop has become the dominant architecture for the implementation of GSM phones. The translational loop has the advantage of using a low-pass filter (loop filter) to perform the bandpass filtering. In addition, the constant envelope characteristics of the GSM signals allow the power amplifiers (PAs) to be operated deep into the compressed region, which results in better PA efficiency.

GSM is highly optimized for voice applications and carries no information on its amplitude path. With the increasing demand for higher data rates, which provides for more feature rich applications, GSM can no longer fulfill the needs of mobile device users. The evolution of GSM to General Packet Radio Service (GPRS), EDGE to Enhanced GPRS (EGPRS), and finally, to UMTS illustrates proof of such demand.

Successful transition to newer technologies from older technologies requires seamless integration with no interruption to the current users. Multiple-mode modulators are backwards compatible with the older standards to take full advantage of the large existing implementations and past investments, while having the ability to access the latest networks for more advanced features. There is therefore a continuing need for multiple-mode modulators.

SUMMARY OF THE INVENTION

The polar architectures have a potential for better PA efficiency over the conventional quadrature architectures. This is because the polar modulators usually drive the PAs into the compressed region. The quadrature modulators do not need to go through the process of converting the I/Q signals into polar domain. The conversion process from the I/Q domain to the polar domain is a bandwidth expansion process and should be avoided if possible. The multiple-mode modulator includes the PA efficiency from polar modulators, and processes the signal in its original I/Q-form without going through the bandwidth expansion process.

In some embodiments, the multiple-mode modulator is configured similarly to a direct conversion quadrature modulator with an infusion of an AM compensation feedback loop and a PM compensation feedback loop from the large signal polar modulator to improve the PA efficiency. This multiple-mode architecture provides similar PA efficiencies as the polar architecture by operating the PA into the compressed region. In addition, the multiple-mode architecture processes the signal partially in the I/Q domain and partially in the polar domain. Consequently, bandwidth expansion is much less for this architecture. By processing the signal in the mixed form of the I/Q domain and the polar domain, this architecture is easily applicable to other higher data rate standards, for example 802.11x and WiMAX.

BRIEF DESCRIPTION OF THE SEVERAL VIEWS OF THE DRAWINGS

FIG. 13 illustrates an exemplary high-power signal input to the final stage power amplifier.

FIG. 14 illustrates an exemplary mid-power signal input to the final stage power amplifier.

FIG. 15 illustrates an exemplary low-power signal input to the final stage power amplifier.

The present invention is described relative to the several views of the drawings. Where appropriate and only where identical elements are disclosed and shown in more than one drawing, the same reference numeral will be used to represent such identical elements.

DETAILED DESCRIPTION

Embodiments of the present invention are directed to multiple-mode modulators. Those of ordinary skill in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of the present invention are directed to a multiple-mode modulator configured to receive a baseband signal, convert the baseband signal to a radio frequency (RF) signal, and to process the RF signal according to either a polar mode or a quadrature mode, depending on a time-varying input voltage of the RF signal. The final stage power amplifier receives an AM signal at an input supply port and a RF signal at an input RF port. The RF signal includes both amplitude modulation and phase modulation. As such, the power amplifier processes the amplitude modulation through both the input RF port and the input supply port.

Figure 1:
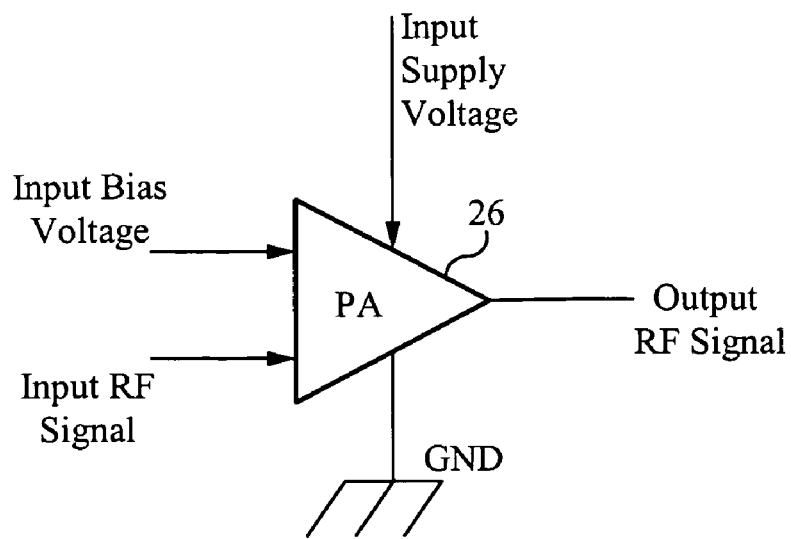
FIG. 1 illustrates the basic input port definitions of a power amplifier.
Figure 2:
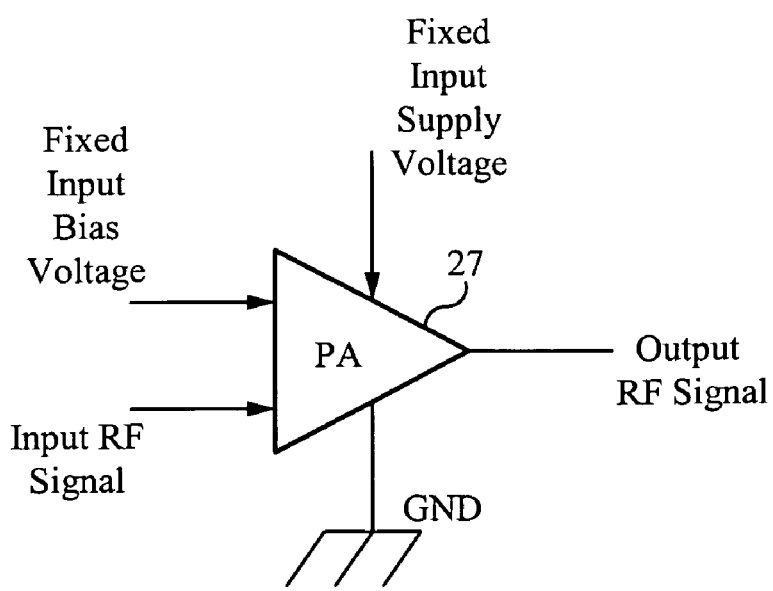
FIG. 2 illustrates a power amplifier configured to operate within a quadrature modulator.
Figure 3:
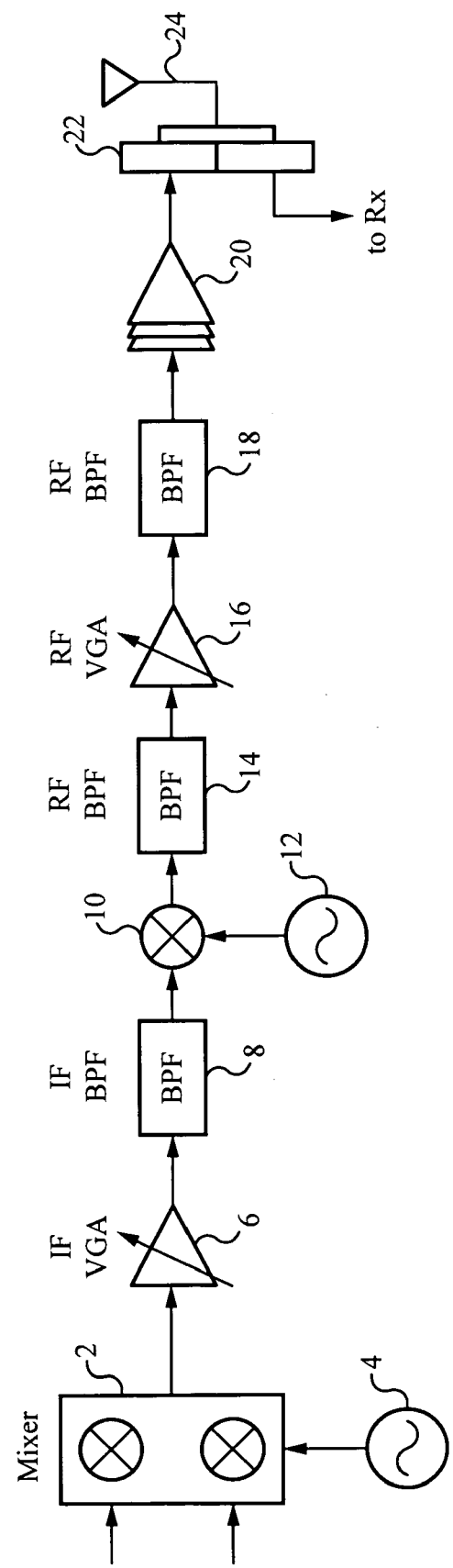
FIG. 3 illustrates a super-heterodyne quadrature modulator.
Figure 4:
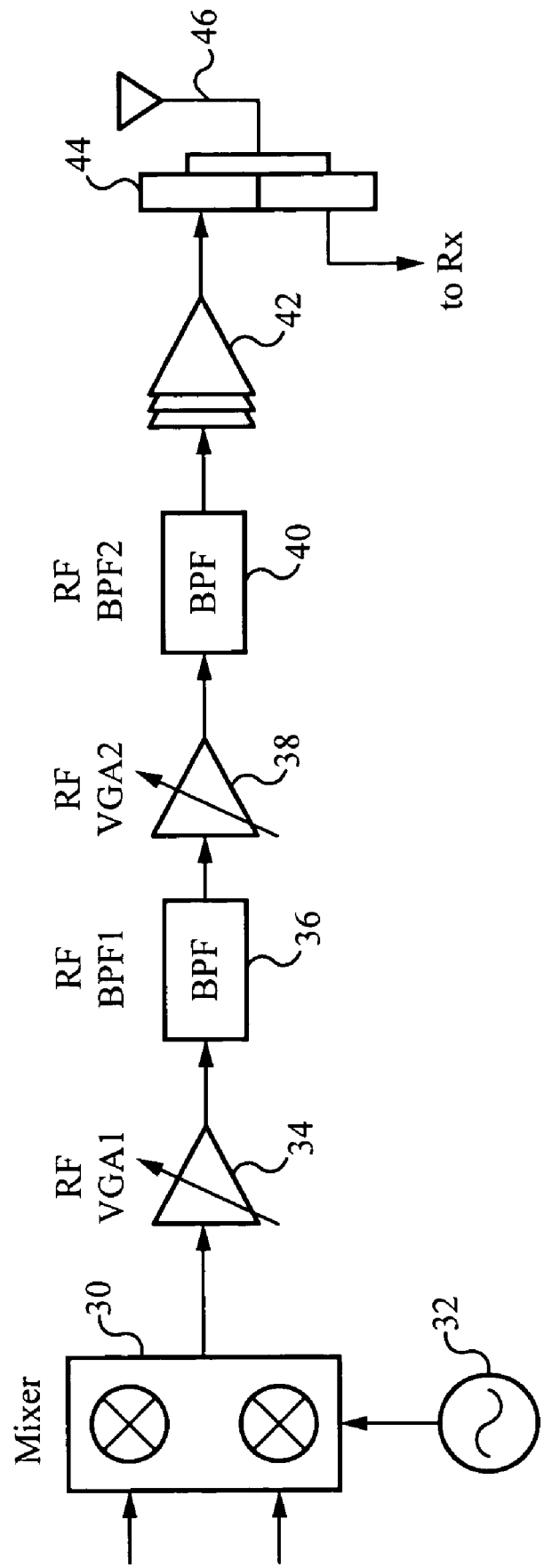
FIG. 4 illustrates a direct conversion quadrature modulator.
Figure 5:
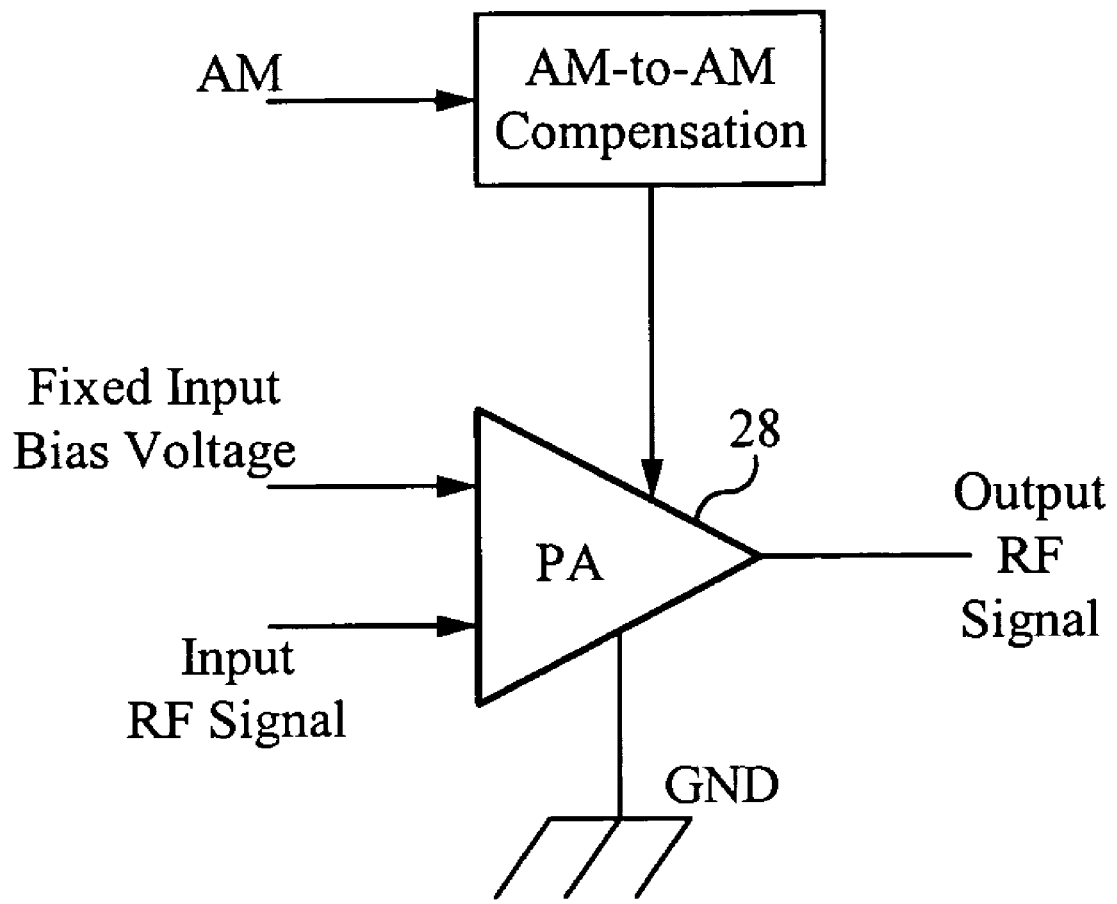
FIG. 5 illustrates a power amplifier configured to operate within a polar modulator.
Figure 6:
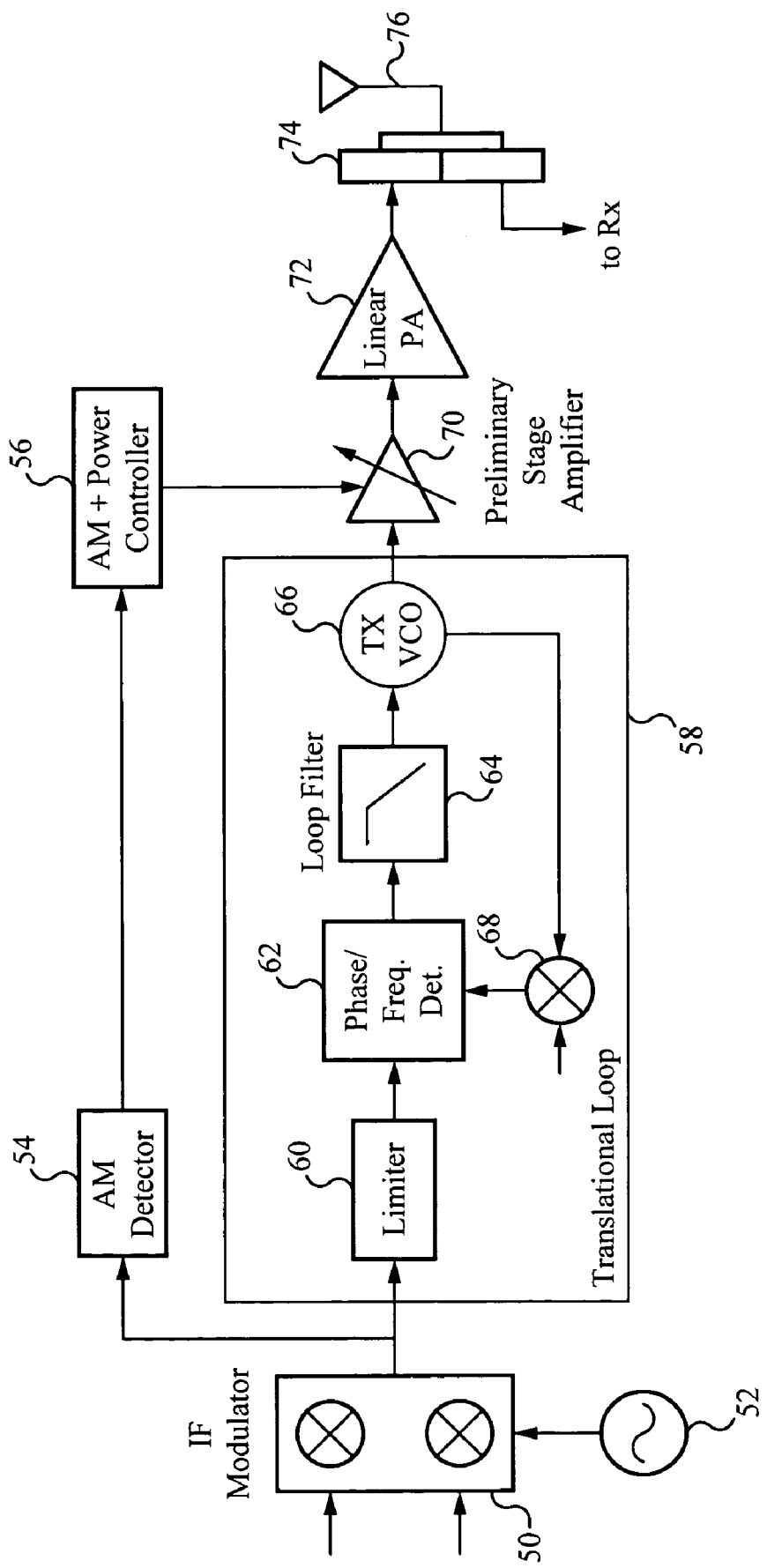
FIG. 6 illustrates a small signal polar modulator.
Figure 7:
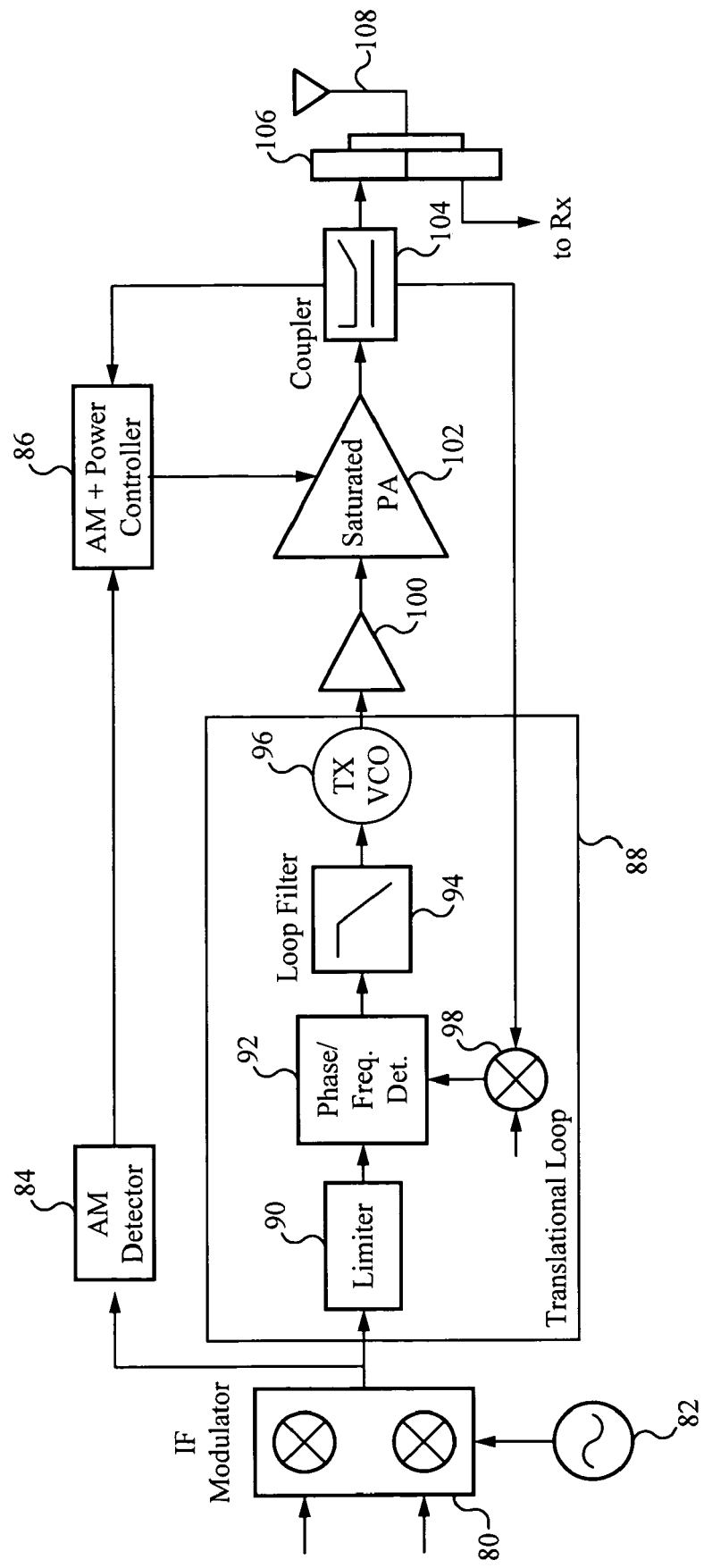
FIG. 7 illustrates a large signal polar modulator with closed-loop compensation.
Figure 8:
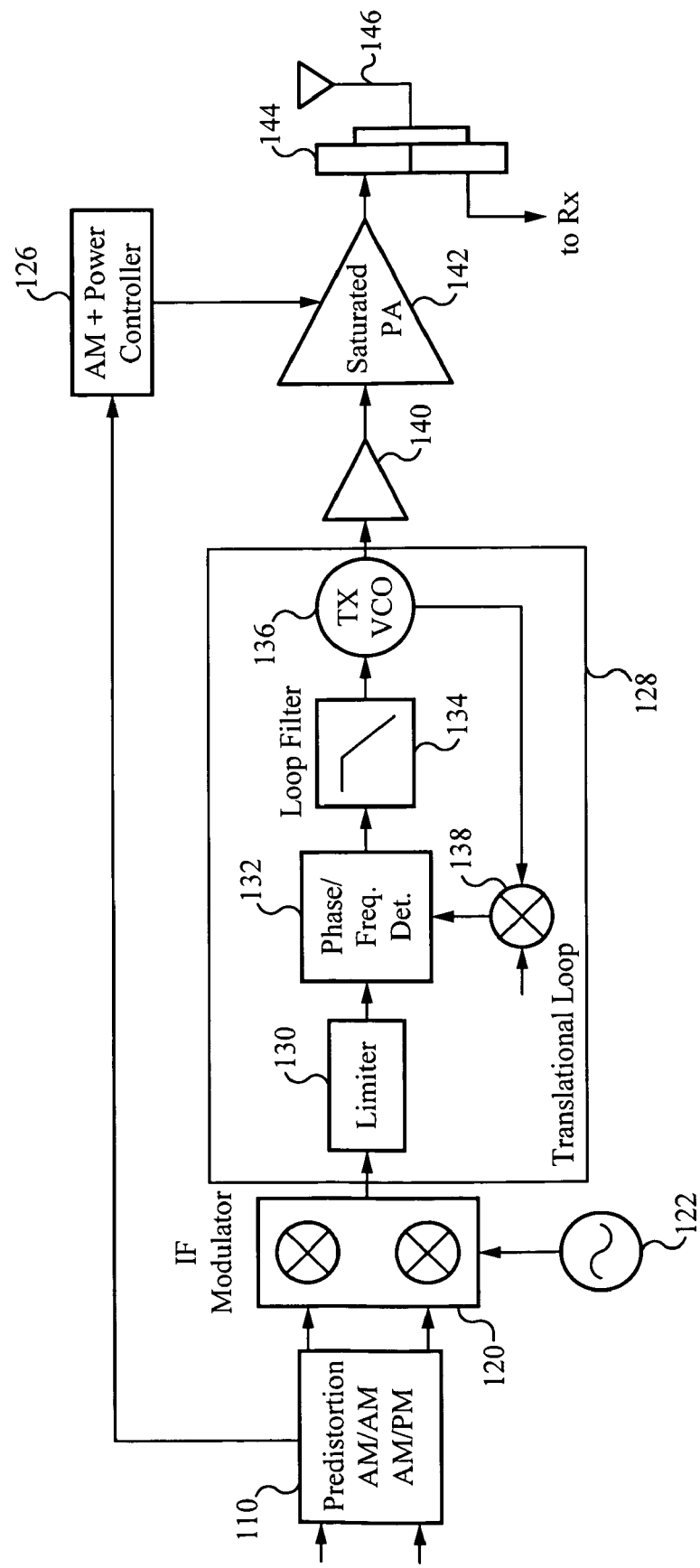
FIG. 8 illustrates a large signal polar modulator with open-loop compensation.
Figure 9:
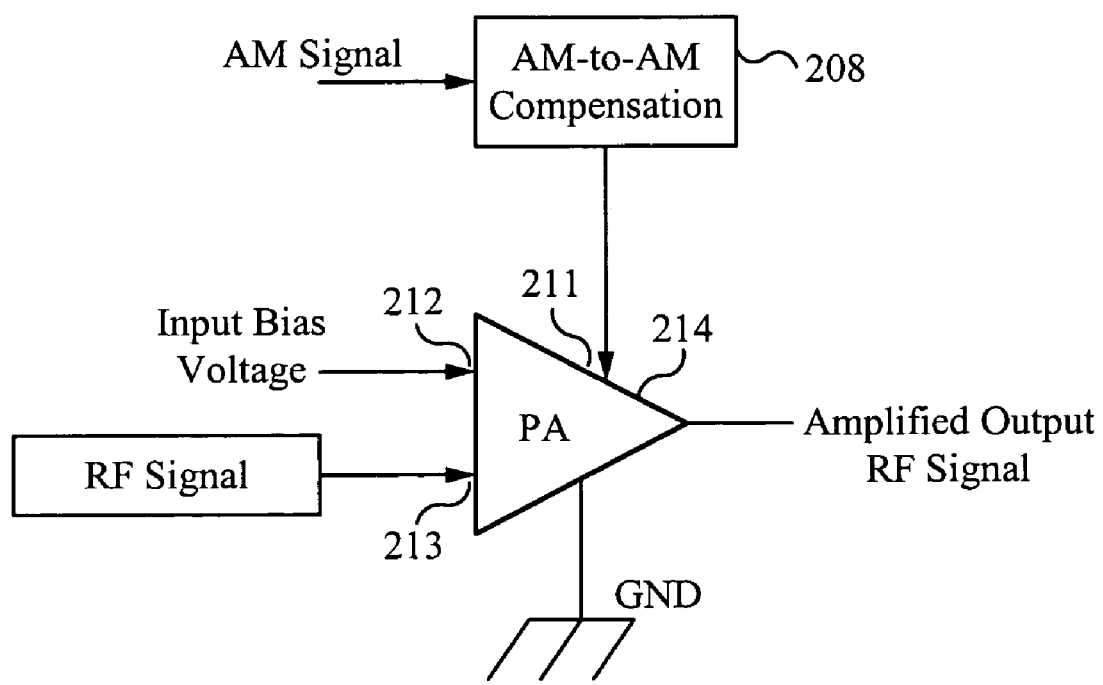
FIG. 9 illustrates an exemplary power amplifier configured to operate within the multiple-mode modulator.

FIG. 9 illustrates an exemplary power amplifier configured to operate within the multiple-mode modulator. The power amplifier (PA) 214 processes a compensated AM signal through an input supply port 211. The compensated AM signal is provided by an AM-to-AM compensation module 208. The RF signal is processed through an input RF signal port 213. The input bias voltage is processed through an input bias port 212. The input bias voltage is fixed.

The quadrature mode is implemented using at least one first stage variable gain power amplifier, the final stage PA, and a power control module. In some embodiments, one or more bandpass filters are also included, the number and type of which depends on the characteristics of the input signal. The power control module is coupled to the first stage PA and the final stage PA to control the gain of each. The RF signal is modulated by the first stage PA, the bandpass filter, and the final stage PA, under the control of the power control module. The result is an amplified output RF signal.

The polar mode is implemented using an AM generator, an AM-to-AM compensation module, and a feedback loop between the output of the final stage PA and an input of the final stage PA. The AM generator receives the RF signal and measures an amplitude component, the RF signal envelope. The measured amplitude component is output from the AM generator as an AM signal. The AM-to-AM compensation module receives the amplified RF signal output from the final stage PA and compares the amplitude component of the amplified RF signal to the AM signal corresponding to the original RF signal. When the envelope voltage of the input RF signal is equal to or greater than the saturation voltage of the final stage PA, a portion of the amplitude component of the amplified RF signal is suppressed, and the shape of the amplified RF signal envelope is not the same as the shape of the RF signal as provided in the AM signal. The AM-to-AM compensation module detects this difference and increases the input supply voltage applied to the input supply port of the final stage PA accordingly. In this manner, the AM-to-AM compensation module compensates for the suppressed amplitude component of the amplified output RF signal. When the envelope voltage of the input RF signal is less than the saturation voltage of the final stage PA, as in the quadrature mode, the amplitude component of the amplified output RF signal is not suppressed, and the shape of the amplified output RF signal envelope is the same, or nearly the same, as the shape of the RF signal as provided in the AM signal. When the two signal envelopes are the same, there is not a need to compensate the amplitude component and the AM-to-AM compensation module does not adjust the input supply voltage to the input supply port of the final stage PA. In actual implementation, the two signal envelopes are rarely exactly the same shape, even in the linear region, and the AM-to-AM compensation module provides a minimal input supply voltage to the input supply port of the final stage PA for compensation.

Figure 10:
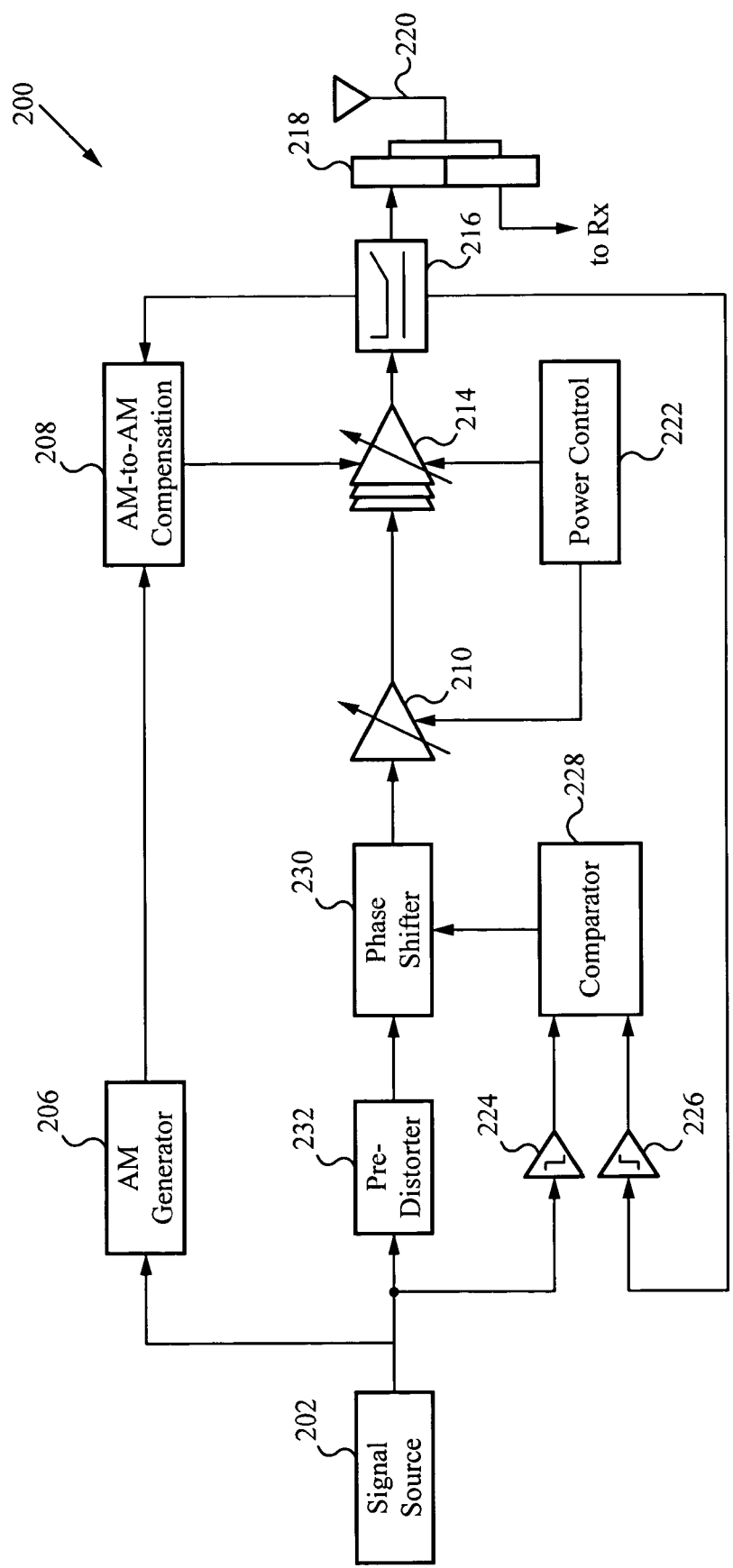
FIG. 10 illustrates an exemplary block diagram of a multiple-mode modulator.

FIG. 10 illustrates an exemplary block diagram of a multiple-mode modulator 200. The multiple-mode modulator 200 includes a signal source 202, an AM generator 206, an AM-to-AM compensation module 208, a preliminary stage amplifier 210, a final stage PA 214, a coupler 216, a duplexer 218, an antenna 220, a power control module 222, and a pre-distorter 232. An input signal is provided by the signal source 202. In some embodiments, the signal source 202 is configured to convert a baseband signal to an RF signal, such as an RF I/Q signal. The signal source 202 outputs the RF I/Q signal, which is input to the AM generator 206, the pre-distorter 232, and the hard-limiting circuit 224. In other embodiments, the signal source 202 includes at least two separate outputs. One output provides a baseband signal to the AM generator 206, and another output provides an RF signal to the pre-distorter 232 and the hard-limiting circuit 224. In this embodiment, the RF signal is derived from the baseband signal provided to the AM generator 206.

The RF I/Q signal output from the signal source 202 is passed through the pre-distorter 232, the phase shifter 230, the preliminary stage amplifier 210, and input to the final stage PA 214. In some embodiments, one or more filters, for example bandpass filters (BPFs), are included in the RF signal path, depending on the characteristics of the RF I/Q signal. Power control of the preliminary stage amplifier 210 and the final stage PA 214 is provided by the power control module 222.

An amplified RF I/Q signal is output from the final stage PA 214 to the coupler 216. The amplified RF I/Q signal output from the final stage 214 is provided from the coupler 216 to the duplexer 218 and transmitted via the antenna 220. The coupler 216 also directs the amplified RF I/Q signal as feedback to the AM-to-AM compensation module 208. The AM-to-AM compensation module 208 receives the amplified RF I/Q signal output from the final stage PA 214 and compares the amplitude component of the amplified RF I/Q signal to an AM signal output from the AM generator 206. The AM generator 206 is configured to receive the RF I/Q signal output from the signal source 202 and to generate the AM signal in response to receiving the RF I/Q signal and according to an algorithm. In some embodiments, the AM generator 206 detects the RF I/Q signal envelope and the AM signal is representative of the RF I/Q signal envelope. In other embodiments, the AM generator 206 also modulates the detected RF I/Q signal envelope, such as pre-distorting the RF I/Q signal envelope, in which case the AM signal represents the modulated RF I/Q signal envelope. In general, the AM signal generated by the AM generator 206 can be the envelope signal of the input RF I/Q signal, or some adaptation of the input RF I/Q signal based on parameters defined by the AM generator 206, or provided to the AM generator 206.

Any difference between the AM signal received from the AM generator 206 and the amplified RF I/Q signal received from the coupler 216 is referred to as AM-to-AM distortion. The AM-to-AM compensation module 208 provides an adjustment, or compensation, voltage as an input supply voltage to the final stage PA 214, thereby compensating for any AM-to-AM distortion. The level of the adjustment voltage corresponds to the level of the AM-to-AM distortion.

The coupler 216 also directs the amplified RF I/Q signal as feedback to the hard-limiting circuit 226, which outputs a corresponding hard-limited amplified RF I/Q signal. The comparator 228 receives as input the hard-limited amplified RF I/Q signal output from the hard-limiting circuit 226 and a hard-limited RF I/Q signal output from the hard-limiting circuit 224. The comparator 228 compares the two input signals for any phase difference. Any detected phase difference represents phase distortion that occurred in the preliminary stage amplifier 210 and/or the PA 214. The phase difference determined by the comparator 228 is input to the phase shifter 230. The phase shifter 230 performs a phase shift on the RF I/Q signal according to the detected phase difference. This phase shift provides a PM compensation to the RF I/Q signal. In some embodiments, the multiple-mode modulator 200 does not include the hard-limiting circuits 224 and 226, in which case, the amplified RF I/Q signal and the RF I/Q signal are input to the comparator 228.

Two stages of amplification are used to accommodate the wide power control range required by some standards, such as the CDMA standard. In some embodiments, the multiple-mode modulator 200 includes more than one preliminary stage amplifier prior to the final stage PA. The feedback from the final stage PA output enables compensation for PA non-linearities while operating in the compressed region, where the PA efficiency is high.

Figure 11:
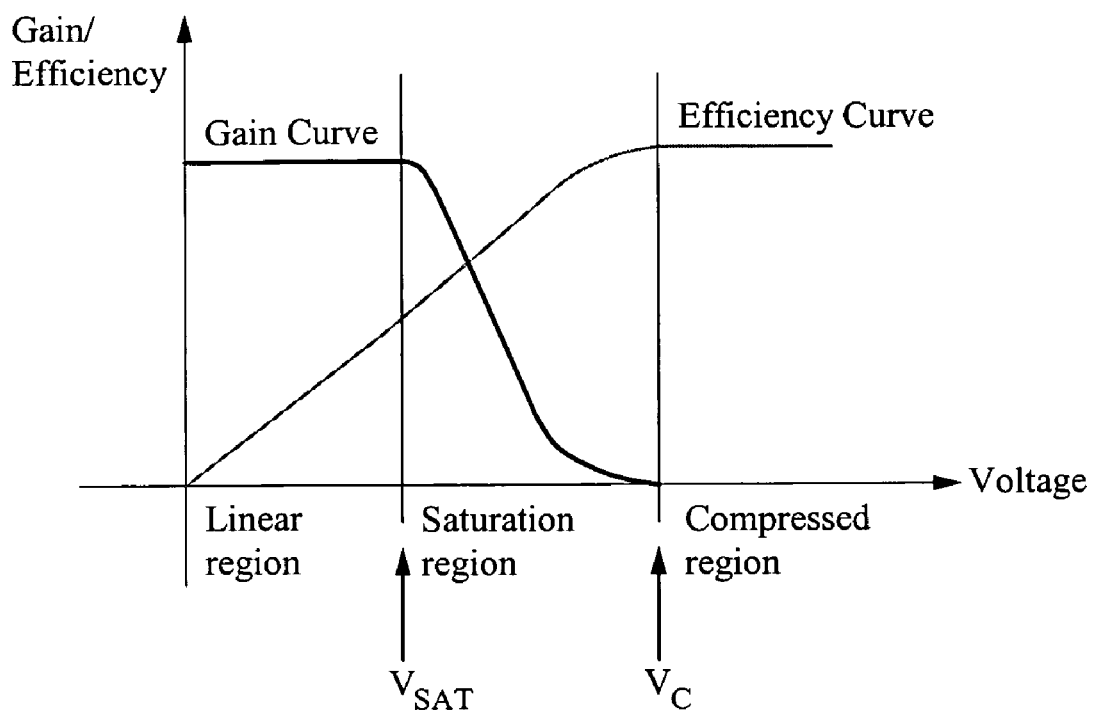
FIG. 11 illustrates exemplary gain and efficiency curves for a typical power amplifier.

FIG. 11 illustrates exemplary gain and efficiency curves for a typical power amplifier, such as the final stage PA 214 in FIG. 10. At high input power levels, the preliminary stage amplifier 210 (FIG. 10) drives the final stage PA 214 (FIG. 10) into the compressed region. This results in significant AM-to-AM distortion, but not so much AM-to-PM distortion. The AM-to-AM distortion is monitored at the output of the final stage PA 214 and fed-back for compensation by adjusting the input supply voltage provided to the final stage PA. If the final stage PA is a basic bipolar junction transistor (BJT) amplifier, then the supply voltage is input at the final stage PA collector. It is understood that the final stage PA can be any other type of amplifier. This compensation technique enables operation of the final stage PA in the compressed region. The dynamic range of the feedback loop is greatly reduced compared to a large signal polar modulator with closed-loop compensation. The feedback loop does not need to cover the full dynamic range of the envelope variation, the linear region, the saturation region, and the compressed region in FIG. 11. The feedback loop only needs to cover the saturation region and the compressed region. In addition, the feedback loop does not need to be designed to accommodate the full power control range. Signals at lower magnitude power levels operate in the linear region of the final stage PA and therefore do not need the feedback compensation. While the final stage PA is operating in the linear region, the feedback compensation provides a constant supply voltage to the final stage PA.

It is understood that the specific threshold levels that indicate transitions between each of the regions is for exemplary purposes only. In application, the transition between each region is a gradual transition, and the indication of a threshold value between regions, such as the threshold value $V_{SAT}$ and the threshold value $V_c$, is intended to represent a transition range in which operation of the power amplifier gradually transitions from one region to the next. For example, the threshold value $V_{SAT}$ is intended to represent the transition range between the linear region and the saturation region. Also, the threshold value $V_c$ is intended to represent the transition range between the saturation region and the compressed region. As there is a gradual transition between regions, there is overlap between regions within the transition ranges.

FIGS. 13-15 illustrate exemplary signals input to the final stage PA 214. The signal envelope provides the input power level information. As indicated by a non-constant envelope shape, the input power level varies with time between a maximum input power level and a minimum input power level. For signals that include high input power levels, the signal envelope sweeps across all three regions, as shown in FIG. 13. High input power levels are defined as those power levels that correspond to the compressed region in FIG. 11. However, for input mid-power levels, those power levels that correspond to the saturation region in FIG. 11, the signal envelope sweeps across only the linear and the saturation regions, as shown in FIG. 14. For low input power levels, those power levels that correspond to the linear region in FIG. 11, the signal envelope sweeps across only the linear region, as shown in FIG. 15. Therefore, no feedback compensation is required for low input power levels. As a result, no power-alignment loop is required and the dynamic range for the feedback path is greatly reduced. Minimal feedback compensation is required for input mid-power levels.

As can be seen from FIG. 11, the linear region has fixed gain. Therefore no compensation is required when operating in this region. As applied to the multiple-mode modulator, low-power levels operate in the linear region. As operation of the power amplifier moves from the linear region to the saturation region, the gain starts to decrease. As a result, compensation is required when operating in the saturation region. Compensation is provided via the input supply port of the power amplifier. As the gain decreases, more compensation is needed to make up for the gain-loss. Finally the last region is the compressed region. In the compressed region, the final stage PA functions as a switch, therefore yielding the best PA efficiency.

For high output power levels, the multiple-mode modulator operates in compressed region. For low output power levels, the multiple-mode modulator operates in the linear region. As can be seen from the efficiency curve (FIG. 11), the final stage PA is more efficient when operating in the saturation region and the compressed regions than when in the linear region. This is the advantage of the multiple-mode modulator over a direct conversion quadrature modulator. Therefore, the multiple-mode modulator efficiency is drastically improved comparable to a direct conversion quadrature modulator. The greater the amount of time the final stage PA spends in the compressed region, the higher the overall efficiency of the multiple-mode modulator.

The envelope modulation is provided to both the input RF port and the input supply port of the final stage PA. The collector voltage, in the case of a BJT final stage power amplifier, possesses a constant envelope property when the final stage PA is operating in the compressed region. The envelope modulation can be reconstructed by varying the supply voltage input to the final stage PA. A significant difference between the multiple-mode modulator and a polar modulator is that operation of the multiple-mode modulator increases the dynamic range of the envelope modulation by supplying the envelope information to the input RF port and to the input supply voltage of the final stage PA. This is important for signals with very large envelope variation.

Figure 12:
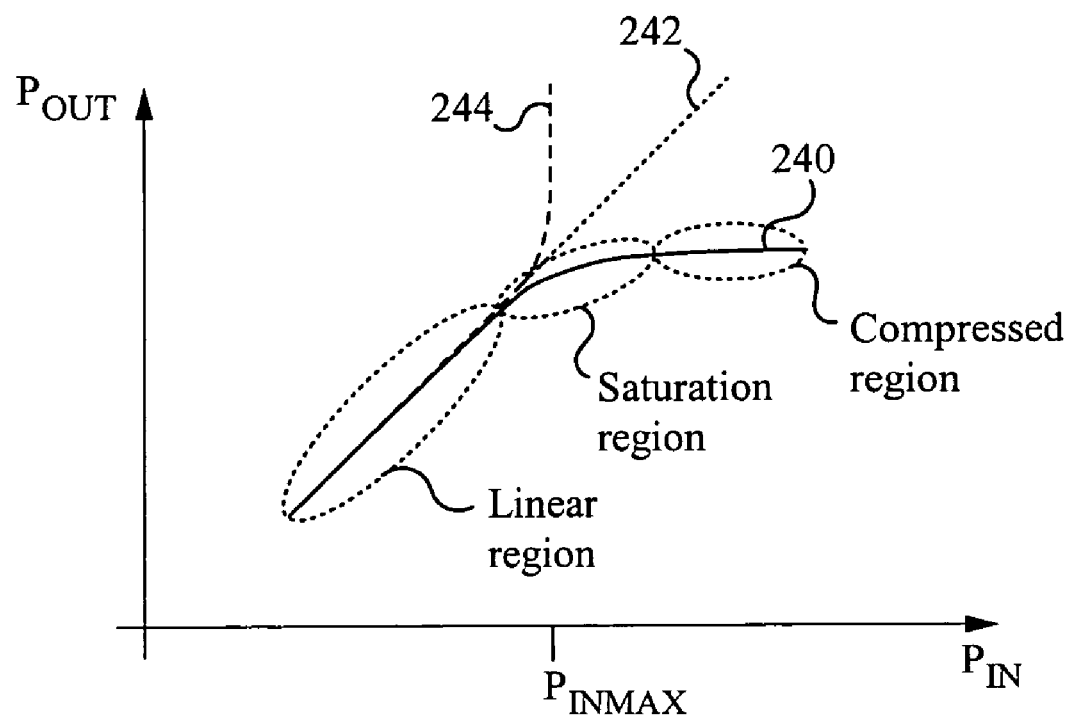
FIG. 12 illustrates an exemplary input power versus output power graph for the power amplifier under various implementations.

FIG. 12 illustrates an exemplary input power versus output power graph for the PA 214 under various implementations. The input power $P_{IN}$ represents the signal input at the input RF signal port and the output power $P_{OUT}$ represents the signal output from the PA 214. The power curve 240 represents the output power response of the power amplifier operating under operating conditions. The sloped, left-hand portion of the curve 240 corresponds to the linear region, the flat, right-hand portion of the curve 240 corresponds to the compressed region, and the curved portion of the curve 240 corresponds to the saturation region.

As implemented within the multiple-mode modulator 200, the PA 214 operates in the quadrature mode while in the linear region, and transitions to the polar mode once operating in the compressed region. As previously described, operating in the polar mode increases the efficiency of the PA 214. The power curve 242 in FIG. 12 shows an exemplary input power versus output power relationship of the PA 214 when configured within the multiple-mode modulator 200. The power curve 242 is representative of the multiple-mode modulator 200 configured without the pre-distorter 232. In this configuration, when operating the PA 214 in the compressed region, the input power $P_{IN}$ to the PA 214 is increased to generate an increased output power $P_{OUT}$. To increase the input power $P_{IN}$, the preliminary stage amplifier(s) preceding the PA 214 increases the power supplied to the PA 214. As can be seen in FIG. 12, the power curve 242 is more efficient than the power curve 240 when the PA 214 operates in the compressed region. However, the multiple-mode modulator configured without the pre-distorter in the RF signal path, represented as power curve 242, is not as efficient as the multiple-mode modulator configured with the pre-distorter in the RF signal path, represented as power curve 244.

Referring to FIG. 10, the pre-distorter 232 is configured to limit the level of the RF I/Q signal, effectively clipping the RF I/Q signal whenever the RF I/Q signal exceeds a maximum value, which is a predetermined, application-specific value. As the RF I/Q signal is input to the PA 214 via the input RF signal port, the RF I/Q signal is represented by the input power $P_{IN}$, as shown in FIG. 12. By limiting the RF I/Q signal to a maximum value, the input power $P_{IN}$ is effectively limited to a maximum input power $P_{INMAX}$. In some embodiments, the pre-distorter 232 is a peak-limiting circuit. In other embodiments, the pre-distorter 232 is configured to apply pre-distortion in order to limit the RF I/Q signal to the maximum level.

The PA 214 includes the input RF port to receive the input RF I/Q signal and the input supply port to receive the amplitude modulation. The output power $P_{OUT}$ is driven higher by the input power $P_{IN}$. Once the input power $P_{IN}$ reaches the maximum level $P_{INMAX}$, the output power is further driven higher by the input supply voltage.

The multiple-mode modulator 200 is configured to apply pre-distortion, via the pre-distorter 232, after the baseband signal is converted to the RF signal.

Figure 16:
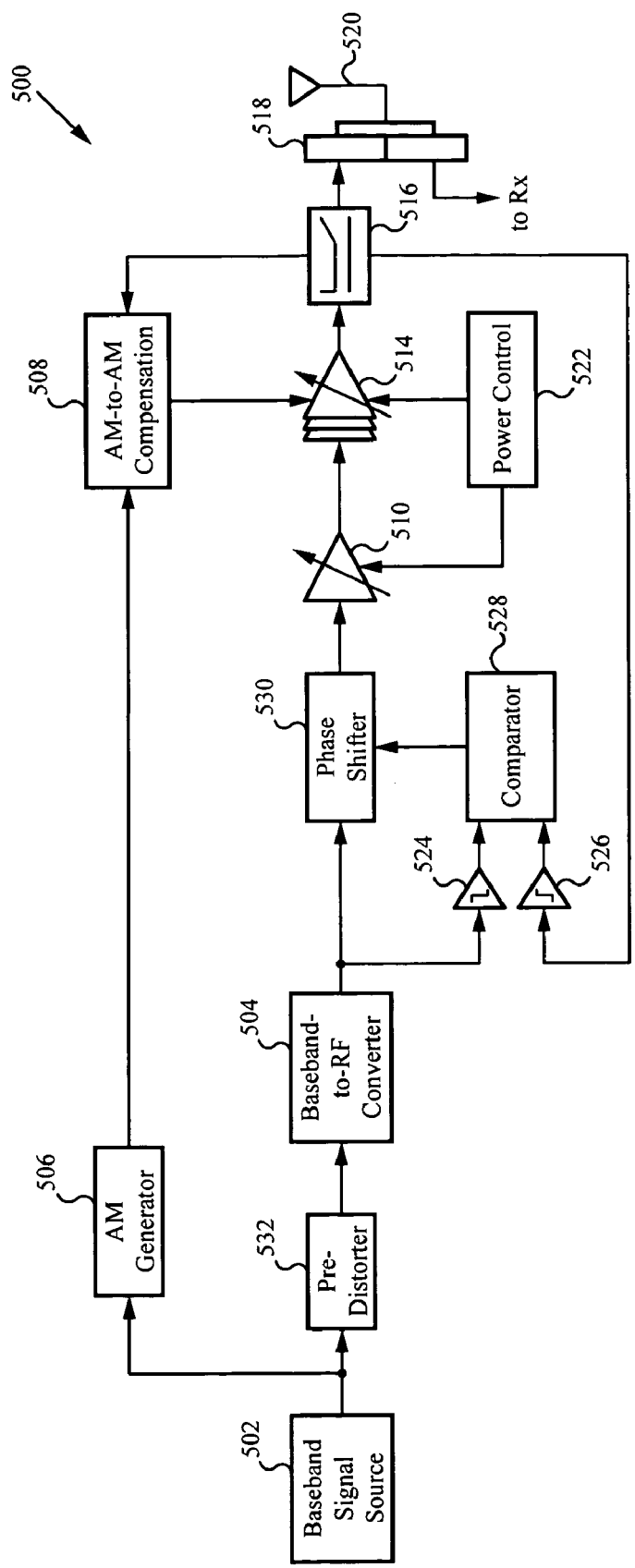
FIG. 16 illustrates an alternative embodiment of a multiple-mode modulator.

FIG. 16 illustrates an alternative embodiment of a multiple-mode modulator 500. The multiple-mode modulator 500 is configured to function similarly as the multiple-mode modulator 200 except that the pre-distorter in the multiple-mode modulator 500 precedes the baseband-to-RF converter. In particular, the baseband signal source 502 outputs a baseband signal to the AM generator 506 and to the pre-distorter 532. The pre-distorter 532 pre-distorts the baseband signal in a manner similar to the pre-distorter 232 of the multiple-mode modulator 200 (FIG. 10). A distorted baseband signal is output from the pre-distorter 532 and input to the baseband-to-RF converter 504, where the distorted baseband signal is converted to a distorted RF signal. The distorted RF signal is output to the phase shifter 530 and to the hard-limiting circuit 524.

The multiple-mode modulators 200 and 500 are configured to combine the amplitude modulation and the phase modulation at the final stage PA 214, 514.

Figure 17:
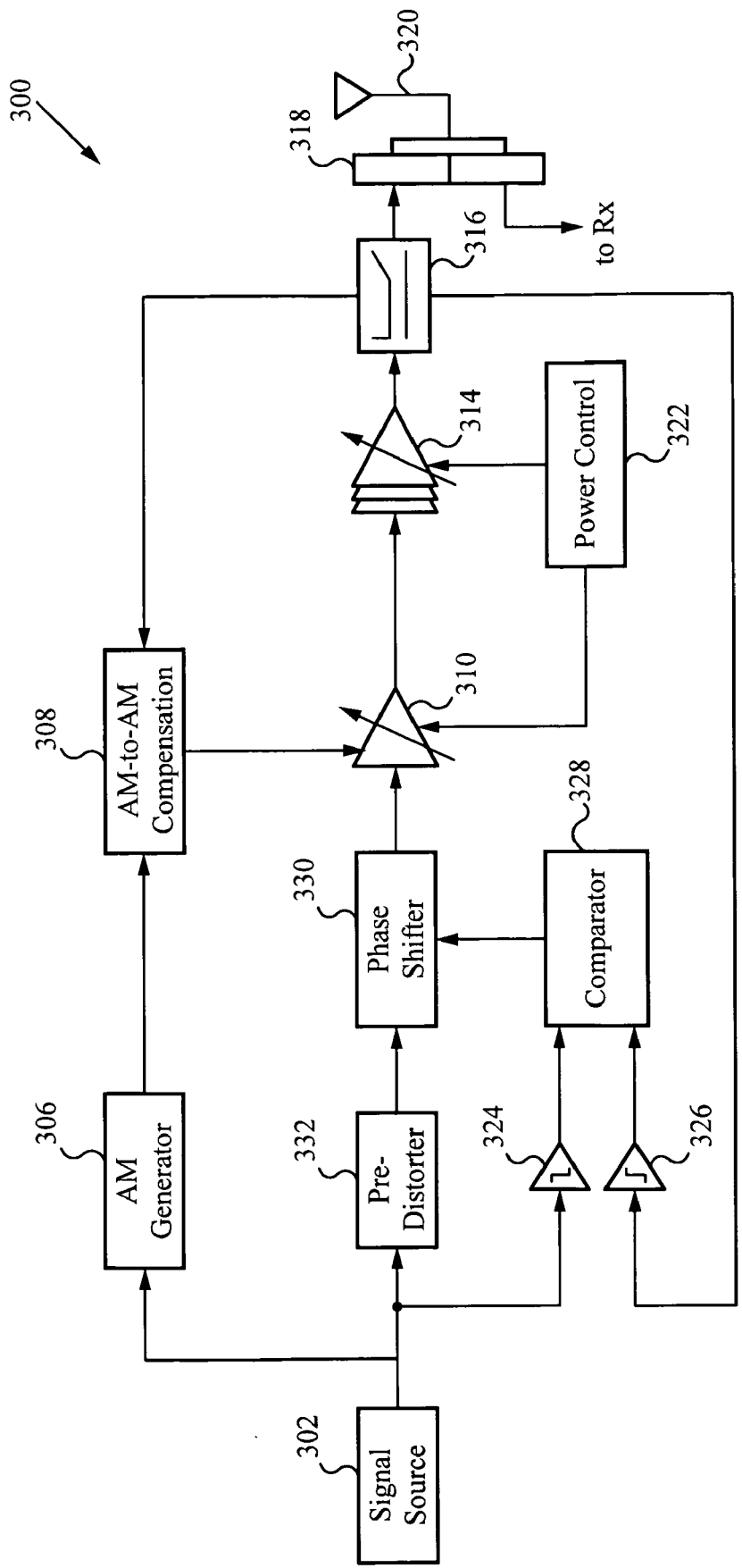
FIG. 17 illustrates an alternative embodiment of a multiple-mode modulator.

FIG. 17 illustrates an alternative embodiment of a multiple-mode modulator 300. The multiple-mode modulator 300 is configured to function similarly as the multiple-mode modulator 200 except that the multiple-mode modulator 300 combines the amplitude modulation and the phase modulation prior to the final stage PA. In particular, the amplitude signal output from the AM-to-AM compensation module 308 and the RF I/Q signal output from the phase shifter 330 are combined at the preliminary stage amplifier 310. A first amplified RF I/Q signal is output from the preliminary stage amplifier 310 and input to the final stage PA 314. A second amplified RF I/Q signal is output from the final stage PA 314 and provided as feedback to the AM-to-AM compensation module 308 and to the hard-limiting circuit 326.

The multiple-mode modulator 300 includes a feedback loop at the output of the final stage PA 314. Alternatively, a feedback loop is configured prior to the final stage PA.

Figure 18:
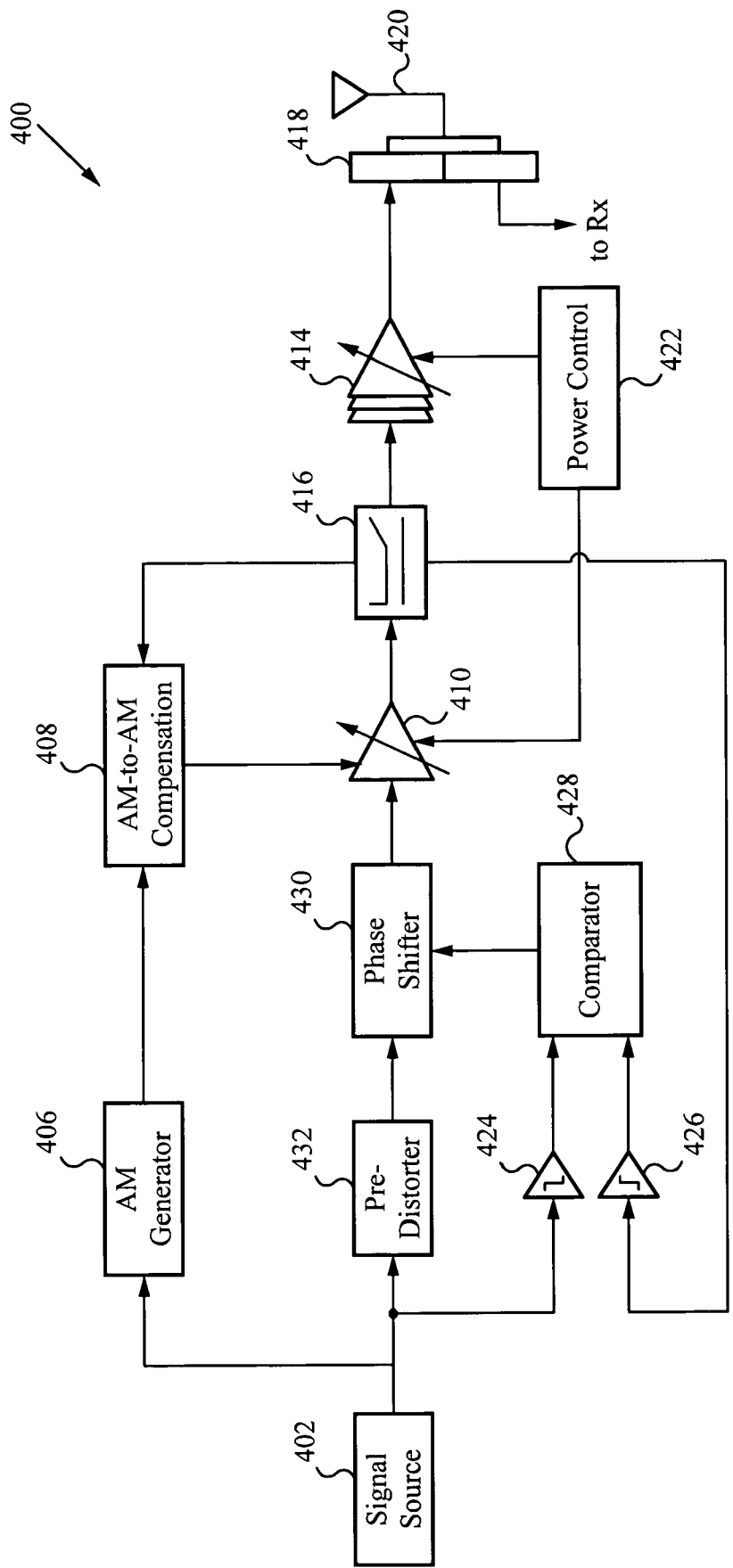
FIG. 18 illustrates an alternative embodiment of a multiple-mode modulator.

FIG. 18 illustrates an alternative embodiment of a multiple-mode modulator 400. The multiple-mode modulator 400 is configured to function similarly as the multiple-mode modulator 300 except that the feedback loop is configured at the output of the preliminary stage amplifier 410. In this configuration, a first amplified RF I/Q signal output from the preliminary stage amplifier 410 is provided as feedback to the AM-to-AM compensation module 408 and to the hard-limiting circuit 426. The first amplified RF I/Q signal is also provided as input to the final stage PA 414.

The signal source 302 of the multiple-mode modulator 300 and the signal source 402 of the multiple-mode modulator 400 can alternatively be configured in a manner similar to the baseband signal source 502, the pre-distorter 532, and the baseband-to-RF converter 504 of the multiple-mode modulator 500 (FIG. 16). In these alternative configurations, a baseband signal is provided to the AM generator 306 of the multiple-mode modulator 300, and a baseband signal is provided to the AM generator 406 of the multiple-mode modulator 400.

The multiple-mode modulators 200, 300, 400 are configured as closed-loops, via the feedback paths. Feedback provides real-time adaptation to compensate for distortion in the final stage PA. In alternative embodiments, the multiple-mode modulator is configured as an open-loop without feedback compensation. Lacking feedback compensation, pre-distortion is used based on the known characteristics of the final stage PA. In such an open-loop configuration, the more stable the performance of the final stage PA, the more effective the pre-distortion in compensating for the distortion caused by the final stage PA. Pre-distortion for compensation of the final stage PA is provided by the AM generator, the AM-to-AM compensation module, and/or the pre-distorter. Pre-distortion is applied in this manner to either or both the amplitude modulation and the phase modulation, while the final stage PA operates in either the linear region, the saturation region, or the compressed region. Separate pre-distortion is applied to limit the input RF signal provided to the final stage PA.

The multiple-mode modulator provides many advantages, some of which include the following. First, the multiple-mode modulator provides a multiple-mode platform, where a version of the direct conversion quadrature architecture is modified to include an amplitude modulation feedback loop. In such a configuration, advantages of both polar modulators and quadrature modulators are realized. Second, the power amplifier efficiency is increased as compared to quadrature modulators. The feedback loop including the AM-to-AM compensation module enables the final stage PA to operate in the compressed region, where the efficiency is higher. Third, the multiple-mode modulator does not suffer much from signal bandwidth expansion. The signal is processed partially in the I/Q domain and partially in the polar domain. As a result, signal bandwidth expansion is not as severe as the polar approach. The smaller signal bandwidth associated with the I/Q domain usually means simpler circuitry and less current consumption.

Fourth, the multiple-mode modulator utilizes a large dynamic range for envelope modulation. The signal strength at the input RF port of the final stage PA is backed-off when the envelope modulation of the signal is small. In conjunction with the feedback loop and the AM-to-AM compensation module, the dynamic range for the envelope modulation is drastically increased.

The present application has been described in terms of specific embodiments incorporating details to facilitate the understanding of the principles of construction and operation of the power amplification circuit. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

We claim:
1. A multiple-mode modulator comprising:
 a. a signal source configured to generate a radio frequency signal from a baseband signal;
 b. a power amplifier configured to receive a fixed input bias voltage, to operate in a linear region, a compressed region, and a saturation region, wherein the saturation region transitions between the linear region and the compressed region, and to output an amplified radio frequency signal;
 c. an amplitude modulation signal path coupled to the signal source and an input supply port of the power amplifier, wherein the amplitude modulation signal path is configured to generate an amplitude modulation signal according to the baseband signal, further wherein the amplitude modulation signal is configured to compensate for a power amplifier distortion; and
 d. a radio frequency signal path coupled to the signal source and an input radio frequency signal port of the power amplifier, wherein the radio frequency signal path is configured to provide a modulated radio frequency signal to the input radio frequency signal port of the power amplifier, wherein the modulated radio frequency signal includes a phase modulation signal and amplitude modulation of the radio frequency signal generated by the signal source.

2. The multiple-mode modulator of claim 1 wherein the amplitude modulation signal path includes an amplitude modulation generator configured to generate the amplitude modulation signal.

3. The multiple-mode modulator of claim 1 wherein the multiple-mode modulator is configured to operate in a quadrature mode when the power amplifier is operating in the linear region, and to operate in a polar mode when the power amplifier is operating in the compressed region.

4. The multiple-mode modulator of claim 1 further comprising a power control module coupled to the power amplifier.

5. The multiple-mode modulator of claim 1 wherein the multiple-mode modulator is configured as an open-loop.

6. The multiple-mode modulator of claim 1 wherein the radio frequency signal path includes a pre-distortion module configured to limit the radio frequency signal input to the input radio frequency signal port of the power amplifier to a maximum value.

7. The multiple-mode modulator of claim 1 wherein the baseband signal comprises a baseband I/Q signal and the radio frequency signal comprises a radio frequency I/Q signal.

8. The multiple-mode modulator of claim 1 wherein the signal source comprises a baseband signal source and a baseband-to-radio frequency converter coupled to an output of the baseband signal source.

9. The multiple-mode modulator of claim 8 wherein the amplitude modulation signal path is coupled to an output of the baseband-to-radio frequency converter, and the radio frequency signal path is coupled to the output of the baseband-to-radio frequency converter.

10. The multiple-mode modulator of claim 8 wherein the amplitude modulation signal path is coupled to an output of the baseband signal source, and the radio frequency signal path is coupled to the output of the baseband-to-radio frequency converter.

11. The multiple-mode modulator of claim 8 wherein the signal source further comprises a pre-distortion module coupled between the baseband signal source and the baseband-to-radio frequency converter, wherein the pre-distortion module is configured to limit the baseband signal such that the radio frequency signal input to the input radio frequency signal port of the power amplifier is limited to a maximum value.

12. The multiple-mode modulator of claim 1 wherein the power amplifier comprises a final stage power amplifier.

13. The multiple-mode modulator of claim 12 further comprising:
 a. a first feedback loop coupled to an output of the final stage power amplifier and to the amplitude modulation signal path; and
 b. a second feedback loop coupled to the output of the final stage power amplifier and to the radio frequency signal path.

14. The multiple-mode modulator of claim 12 wherein the amplitude modulation signal path includes an amplitude modulation generator configured to generate the amplitude modulation signal such that the amplitude modulation signal includes a pre-distortion module configured to compensate for predetermined characteristics of the final stage power amplifier.

15. The multiple-mode modulator of claim 1 wherein the power amplifier comprises a preliminary stage amplifier and a final stage power amplifier coupled to an output of the preliminary stage amplifier, further wherein the amplitude modulation signal path is coupled to an input supply port of the preliminary stage amplifier and the radio frequency signal path is coupled to an input radio frequency signal port of the preliminary stage amplifier.

16. The multiple-mode modulator of claim 15 further comprising:
 a. a first feedback loop coupled to an output of the final stage power amplifier and to the amplitude modulation signal path; and
 b. a second feedback loop coupled to the output of the final stage power amplifier and to the radio frequency signal path.

17. The multiple-mode modulator of claim 15 further comprising:
 a. a first feedback loop coupled to the output of the preliminary stage amplifier and to the amplitude modulation signal path; and b. a second feedback loop coupled to the output of the preliminary stage amplifier and to the radio frequency signal path.

18. The multiple-mode modulator of claim 15 wherein the amplitude modulation signal path includes an amplitude modulation generator configured to generate the amplitude modulation signal such that the amplitude modulation signal includes a pre-distortion module configured to compensate for predetermined characteristics of the final stage power amplifier.

19. The multiple-mode modulator of claim 1 further comprising a feedback loop coupled to an output of the power amplifier and to the amplitude modulation signal path.

20. The multiple-mode modulator of claim 1 further comprising a feedback loop coupled to an output of the power amplifier and to the radio frequency signal path.

21. A method of modulating a signal, the method comprising:
   a. generating a radio frequency signal from a baseband signal;
   b. providing a fixed input bias voltage to a power amplifier;
   c. configuring the power amplifier to operate in a linear region, a compressed region, and a saturation region, wherein the saturation region transitions between the linear region and the compressed region, and to output an amplified radio frequency signal;
   d. generating an amplitude modulation signal according to the baseband signal, wherein the amplitude modulation signal compensates for a power amplifier distortion;
   e. generating a phase modulation signal according to the radio frequency signal, wherein the phase modulation signal compensates for the power amplifier distortion; and
   f. inputting the amplitude modulation signal to an input supply port of the power amplifier and inputting the phase modulation signal to an input radio frequency signal port of the power amplifier.

22. The method of claim 21 further comprising configuring the power amplifier within an open-loop configuration.

23. The method of claim 21 further comprising pre-distorting the radio frequency signal to limit the phase modulation signal input to the input radio frequency signal port of the power amplifier to a maximum value.

24. The method of claim 21 further comprising providing a modulation radio frequency signal to the input radio frequency signal port of the power amplifier, wherein the modulation radio frequency signal includes the phase modulation signal and an amplitude modulation of the generated radio frequency signal.

25. The method of claim 21 wherein the baseband signal comprises a baseband I/Q signal and the radio frequency signal comprises a radio frequency I/Q signal.

26. The method of claim 21 wherein the power amplifier comprises a final stage power amplifier.

27. The method of claim 26 further comprising:
   a. providing a first feedback signal from an output of the final stage power amplifier, wherein the amplitude modulation signal is generated according to the baseband signal and the first feedback signal; and
   b. providing a second feedback signal from the output of the final stage power amplifier, wherein the phase modulation signal is generated according to the radio frequency signal and the second feedback signal.

28. The method of claim 26 wherein generating the amplitude modulation signal further comprises adding pre-distortion configured to compensate for predetermined characteristics of the final stage power amplifier.

29. The method of claim 21 wherein the power amplifier comprises a preliminary stage amplifier and a final stage power amplifier coupled to an output of the preliminary stage amplifier, further wherein inputting the amplitude modulation signal comprises inputting the amplitude modulation signal to an input supply port of the preliminary stage amplifier and inputting the phase modulation signal comprises inputting the phase modulation signal to an input radio frequency signal port of the preliminary stage amplifier.

30. The method of claim 29 further comprising:
   a. providing a first feedback signal from an output of the final stage power amplifier, wherein the amplitude modulation signal is generated according to the baseband signal and the first feedback signal; and
   b. providing a second feedback signal from the output of the final stage power amplifier, wherein the phase modulation signal is generated according to the radio frequency signal and the second feedback signal.

31. The method of claim 29 further comprising:
   a. providing a first feedback signal from an output of the preliminary stage amplifier, wherein the amplitude modulation signal is generated according to the baseband signal and the first feedback signal; and
   b. providing a second feedback signal from the output of the preliminary stage amplifier, wherein the phase modulation signal is generated according to the radio frequency signal and the second feedback signal.

32. The method of claim 29 wherein generating the amplitude modulation signal further comprises adding pre-distortion configured to compensate for predetermined characteristics of the final stage power amplifier.

33. The method of claim 21 further comprising providing a feedback loop coupled to an output of the power amplifier and to an amplitude modulation signal path.

34. The method of claim 21 further comprising providing a feedback loop coupled to an output of the power amplifier and to a radio frequency signal path.

* * * * *